United States Patent Office 3,658,839
Patented Apr. 25, 1972

3,658,839
ACARICIDALLY AND INSECTICIDALLY ACTIVE
1,5-DISUBSTITUTED-4-CYANO-PYRAZOLES
Hartmut Kiehne and Siegfried Petersen, Leverkusen, Ingeborg Hammann, Cologne, and Gunter Unterstenhofer, Opladen, Germany, assignors to Farbenfabriken Bayer Aktiengesellschaft, Leverkusen, Germany
No Drawing. Filed Nov. 10, 1969, Ser. No. 875,491
Claims priority, application Germany, Nov. 16, 1968,
P 18 09 387.3
Int. Cl. C07d 49/18
U.S. Cl. 260—310 R          12 Claims

ABSTRACT OF THE DISCLOSURE

Compositions and methods of using certain 1,5-disubstituted-4-cyano-pyrazoles, i.e. - 1-(alkyl, hydroxyalkyl and cyanoalkyl)-4-cyano-5-(phenyl, chloro-substituted phenyl, fluorophenyl, alkylphenyl, alkoxyphenyl, trifluoromethylphenyl and cyanophenyl)-pyrazoles, which are new, which possess strong acaricidal and insecticidal properties, and which may be produced by particular methods.

The present invention relates to and has for its objects the provision for particular new active compositions in the form of mixtures with solid and liquid dispersible carrier vehicles of certain 1,5-disubstituted-4-cyano-pyrazoles, i.e. 1-(alkyl, hydroxyalkyl and cyanoalkyl)-4-cyano-5-(phenyl, chloro-substituted phenyl, fluorophenyl, alkylphenyl, alkoxyphenyl, trifluoromethylphenyl and cyanophenyl)-pyrazoles, which are new, and which possess valuable strong arthropodicidal, especially acaricidal and insecticidal, properties, and methods for using such compounds in a new way, especially for combating and controlling arthropods, e.g. acarids and insects, with other and further objects becoming apparent from a study of the within specification and accompanying examples.

It is known that 1-isopropyl-3-methyl-pyrazol-5-yl-N-dimethyl-carbamate (A) can be used for the control of mites and insects (cf. Swiss Pat. 282,655).

Compounds such as 4-cyano-5-phenyl-pyrazole (B) are also known but these are not known to possess acaricidal or insecticidal activity.

In this regard, the members of the class of 1,5-disubstituted-4-cyano-pyrazoles to which the present invention relates are not yet known to have any pesticidal properties, and in fact the instant compounds of this class of 1,5-disubstituted-4-cyano-pyrazoles are still unknown per se. In accordance with copending U.S. application Ser. No. 875,490, filed simultaneously herewith and of overlapping inventorship herewith, a chemically unique process is disclosed and claimed for producing the instant 1,5-disubstituted-4-cyano-pyrazoles and similar active compounds, all of which possess fungicidal properties as well.

It has now been found, in accordance with the present invention, that certain 1,5-disubstituted-4-cyano-pyrazoles, which are new, of the formula

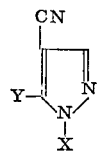

in which

X is alkyl of 1–12 carbon atoms, hydroxyalkyl of 2–4 carbon atoms or cyanoalkyl of 1–4 carbon atoms, and
Y is phenyl, mono to tetra chloro-substituted phenyl, fluorophenyl, alkylphenyl having 1–4 carbon atoms in the alkyl moiety, alkoxyphenyl having 1–4 carbon atoms in the alkoxy moiety, trifluoromethylphenyl or cyanophenyl, exhibit strong arthropodicidal, especially acaricidal and insecticidal, properties.

It is very surprising that the active compounds of Formula I above usable according to the present invention exhibit a higher insecticidal and acaricidal potency than the above-mentioned previously known chemically similar active compound (A) of Swiss Pat. 282,655. It is even more surprising that the instant 1,5-disubstituted-4-cyano-pyrazoles usable according to the present invention exhibit strong insecticidal and acaricidal properties, whereas the previously known 4-cyano-pyrazoles substituted in the 5-position such as compound (B), and possibly also those substituted as well in the 1-position, exhibit no insecticidal and acaricidal properties. Therefore, the use of the instant active compounds according to the present invention represents a valuable contribution to the art.

The 1,5-disubstituted-4-cyano-pyrazoles according to the present invention are clearly characterized by Formula I above.

Advantageously, in accordance with the present invention, in the various formulae herein:

X represents straight and branched chain alkyl hydrocarbon of 1–12 carbon atoms such as methyl, ethyl, n- and iso-propyl, n-, iso-, sec.- and tert.-butyl, n- and iso-amyl, n- and iso-hexyl, n- and iso-heptyl, n- and iso-octyl, n- and iso-nonyl, n- and iso-decyl, n- and iso-undecyl, n- and iso-dodecyl, and the like, especially lower alkyl, and more especially $C_{1-4}$ or $C_{1-3}$ or $C_{1-2}$ alkyl; or hydroxy-substituted lower alkyl hydrocarbon of 2–4 carbon atoms such as hydroxy-ethyl, hydroxy-n-propyl and hydroxy-n-butyl, and the like, or cyano-substituted straight and branched chain lower alkyl hydrocarbon of 1–4 carbon atoms such as cyano--methyl, ethyl, n- and iso-propyl, n-, iso-, sec.- and tert.-butyl, and the like, especially cyano-$C_{1-3}$ or $C_{1-2}$ or $C_{2-4}$ of $C_{2-3}$ alkyl, and more especially ω-cyano-$C_{1-4}$ or $C_{1-3}$ or $C_{1-2}$ or $C_{2-4}$ or $C_{2-3}$ alkyl; and Y represents phenyl;
mono or tetra chloro-phenyl such as 2-, 3- and 4-mono; 2,3-, 2,4-, 2,5-, 2,6-, 3,4- and 3,5-di, 2,3,4-, 2,3,5, 2,3,6-, 2,4,5-, 2,4,6- and 3,4,5-tri; and 2,3,4,5-, 2,3,4,6- and 2,3,5,6-tetra, and the like, -chlorophenyl, and especially 4-chloro-phenyl, 2,4-dichloro-phenyl and 2,3,4,5-tetra chlorophenyl;
fluorophenyl such as 2-, 3- and 4-fluoro-phenyl, and especially 4-fluoro-phenyl;
alkylphenyl having 1–4 carbon atoms in the alkyl moiety such as 2-, 3- and 4-methyl to tert.-butyl, inclusive, as defined above, and the like; -phenyl, especially $C_{1-3}$ or $C_{1-2}$ alkyl-phenyl, and more especially 4-($C_{1-4}$ or $C_{1-3}$ or $C_{1-2}$ alkyl)-phenyl;
alkoxyphenyl having 1–4 carbon atoms in the alkoxy moiety such as 2-, 3- and 4-methoxy, ethoxy, n- and isopropoxy, n-, iso-, sec.- and tert.-butoxy, and the like, -phenyl, especially $C_{1-3}$ or $C_{1-2}$ alkoxy-phenyl, and more especially 4-($C_{1-4}$ or $C_{1-3}$ or $C_{1-2}$ alkoxy)-phenyl;
trifluoromethyl-phenyl such as 2-, 3- and 4-trifluoromethyl-phenyl especially 4-trifluoromethyl-phenyl; or
cyano-phenyl such as 2-, 3- and 4-cyano-phenyl, especially 4-cyano-phenyl.

Preferably, X is $C_{1-12}$ or $C_{1-4}$ alkyl; or $C_{2-3}$ hydroxyalkyl; or cyano-$C_{1-4}$ or $C_{1-3}$ alkyl; and Y is phenyl; or mono to tetra chloro-phenyl; or 4-fluoro-phenyl; or 4-($C_{1-4}$ or $C_{1-3}$ alkyl)-phenyl; or 4-($C_{1-4}$ or $C_{1-3}$ alkoxy)-phenyl; or 4-(trifluoromethyl)-phenyl; or 4-cyano-phenyl.

In particular, X is $C_{1-12}$ alkyl; or hydroxyethyl or cyano-$C_{1-4}$ alkyl; and Y is phenyl; or 4-chloro-phenyl; or 2,4-dichloro-phenyl; or 2,3,4,5-tetra-chloro-phenyl; or 4-fluoro-phenyl; or 4-methyl-phenyl; or 4-methoxy-phenyl; or 4-trifluoromethyl-phenyl; or 4-cyano-phenyl; and especially Y is 4-chloro-phenyl; or 2,4-dichloro-phenyl; or 4-fluoro-phenyl; or 4-methyl-phenyl; or 4-methoxy-phenyl.

The instant 1,5-disubstituted-4-cyano-pyrazoles of Formula I above may be prepared in different ways. Such compounds may be produced in particularly favorable manner by the process which comprises reacting alkoxy and amino derivatives of β-keto-nitriles (i.e. enol ethers and enamines) of the formula:

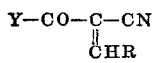  (II)

in which

Y is the same as defined above, and
R is alkoxy, alkylamino or arylamino, with monosubstituted hydrazines of the formula:

  (III)

in which X is the same as defined above, in the presence of carboxylic acids at elevated temperatures (cf. said copending U.S. application Ser. No. 875,490, filed simultaneously herewith).

Some of the starting alkoxy and amino derivatives of the β-keto-nitriles of Formula II above have hitherto been unknown. Such starting compounds, however, can readily be prepared. The precursor β-keto-nitriles required for the preparation of these starting compounds are also only partially known. Such precursor compounds can, however, be readily obtained in known manner by Claisen condensation of suitable carboxylic acid esters, for example benzoic acid esters, with acetonitrile in the presence of the usual basic catalysts or by treatment of α-kalo-ketones, for example ω-chloroacetophenone, with alkali metal cyanides. Suitable precursor β-keto-nitriles include for example benzoylacetonitrile, o-, m- and p-chloro-benzoyl-acetonitrile, p-fluoro-benzoyl-acetonitrile, p-bromo-benzoyl-acetonitrile, p - toluyl-acetonitrile, p-methoxy-benzoyl-acetonitrile, p-trifluoromethyl-benzoyl-acetonitrile, m- and p-nitro-benzoyl-acetonitrile, p-cyano-benzoyl-acetonitrile, p-methylmercapto-benzoyl-acetonitrile, 2,3- and 2,4-dichloro-benzoyl-acetonitrile, 2,4,5-trichloro-benzoyl-acetonitrile, 2,3,4,5 - tetrachloro-benzoyl-acetonitrile, 2,4-dinitro-benzoyl-acetonitrile, 2-chloro-4-nitro-benzoyl-acetonitrile, and the like.

The conversion of the precursor β-keto-nitriles into the starting enol ethers or enamines of Formula II above can also be carried out by known methods by the action of o-formic acid esters in the presence of acetic anhydride of a trace of zinc chloride at temperatures of 100 to 130° C. or by boiling with an N,N'-dialkyl or diaryl formamidine in an inert solvent, such as toluene, xylene or chlorobenzene.

It is generally advisable, for the production process described above, to use the enol ethers as starting materials, since their preparation is less expensive and, in the pyrazole cyclization, they liberate only readily separable alcohol as well as water.

The starting hydrazines of Formula III above can be used either in the form of the free bases or in the form of the corresponding carboxylic acid salts. Less advisable (though still pertinent) is the use of their mineral acid salts, since these should first, before being combined with the enol ether or enamine of Formula II above, be neutralized with a suitable base, expediently sodium acetate.

As examples of the starting hydrazines which can be used (all of which are known) there may be mentioned in particular: methylhydrazine, ethylhydrazine, n- and isopropylhydrazine, n- and isobutylhydrazine, n-amylhydrazine, n-dodecylhydrazine, β-hydroxy-ethylhydrazine, β-hydroxy-propylhydrazine, β-methoxy-ethylhydrazine, β-cyano-ethylhydrazine, and the like.

Examples of suitable carboxylic acids used for the production reaction include all fatty acids with 2 to 6 carbon atoms, simple hydroxycarboxylic acids and lower dicarboxylic acids, as well as aromatic carboxylic acids. There may be mentioned in particular: acetic acid, propionic acid, n- and isobutyric acid, n- and isovaleric acid, caproic acid, lactic acid, oxalic acid, malonic acid, succinic acid, benzoic acid, salicylic acid, and the like. Of these, acetic acid, which can, without disadvantage, also be used in technical grade, is generally very suitable.

Liquid carboxylic acids are preferably used undiluted. Such acids can if desired, however, be diluted (down to 2 mols of acid per mol of hydrazine) with organic solvents, but such dilution seems to afford no preparative or an economic advantage. As diluents, there may be mentioned, for example, aromatic hydrocarbons, such as benzene, toluene and xylene; ethers, such as dioxane and tetrahydrofuran; esters, such as ethyl acetate; and chlorinated hydrocarbons such as methylene chloride, chloroform and chlorobenzene; and the like; as well as water. Solid carboxylic acids may expediently be used in the form of alcoholic solutions as the artisan will appreciate.

The production reaction temperatures can be varied within a fairly wide range. In general, the work is carried out at from substantially between about 40–150° C., and preferably between about 80–100° C.

When carying out the production process, it is expedient to provide 1 mol of the starting enol ether or enamine of the β-keto-nitrile of Formula II above, dissolved or suspended in acetic acid, preferably a 5-fold to 10-fold amount by weight of technical-grade acetic acid, then add at least 1 mol, preferably approximately 1.1 mols, of the starting hydrazine of Formula III above (optionally dissolved in a suitable solvent), with stirring and cooling, in such a manner that the temperature in the reaction vessel does not rise above 20° C., and then to heat slowly to 80 to 100° C., followed by further stirring at this temperature for 1 to 2 hours and, finally, evaporation of substantially all volatile matter, for example in a vacuum at bath temperatures up to 100° C., after which the reaction mixture frequently solidifies into a slurry of crystals.

In this way, when pure starting materials are used, very pure products may be obtained, even in practically quantitative yield.

Advantageously, the active compounds according to the present invention show strong insecticidal and acaricidal effects, with low toxicity to warm-blooded animals and conmoitantly low phytotoxicity. The effects set in rapidly and are long-lasting. Such compounds can therefore be used with markedly good results for the control of noxious sucking and biting insects, Diptera and mites in the crop protection field and against household pests and, because of their high stability to alkali, in particular for the treatment of limed walls.

To the sucking insects contemplated herein there belong, in the main, aphids, such as the green peach aphid (*Myzus persicae*), the bean aphid (*Doralis fabae*); scales, such as *Aspidiotus hederae, Lecanium hesperidum, Pseudoccus maritimus*; Thysanoptera, such as *Hercinothrips femoralis*; and bugs, such as the beet bug (*Piesma quadrata*) and the bed bug (*Cimex lectularius*); and the like.

To be classed with the biting insects contemplated herein are in the main butterfly caterpillars, such as *Plutella maculipennis, Lymantria dispar*; beetles, such as granary weevils (*Sitophilus granarius*), the Colorado beetle (*Leptinotarsa decemlineata*), but also species living in the soil, such as the wireworms (*Agriotes* sp.) and larvae of the cockchafer (*Melolontha melolontha*); cockroaches, such as the German cockroach (*Blattella germanica*); Orthoptera, such as the house cricket (*Acheta domesticus*); termites, such as Reticulitermes; and Hymenoptera, such as ants, including the garden ant (*Lasius niger*); and the like.

The diptera contemplated herein comprise, in particular, the flies, such as the vinegar fly (*Drosophila melanogaster*), the Mediterranean fruit fly (*Ceratitis capitata*), the house fly (*Musca domestica*), and mosquitoes, such as the yellow fever mosquito (*Aedes aegypti*); and the like.

In the case of the mites contemplated herein, particularly important are the spider mites (Tetranychidae) such as the two-spotted spider mite (*Tetranychus urticae*), the European red mite (*Panonychus ulmi*); gall mites, such as the currant gall mite (*Eriophyes ribis*), and tarsonemids, such as *Tarsonemus pallidus* and ticks, such as *Boophilus microphlus*; and the like.

The active compounds according to the instant invention can be utilized, if desired, in the form of the usual formulations or compositions with conventional inert (i.e. plant compatible or herbicidally inert) pesticide diluents or extenders, i.e. diluents or extenders of the type usable in conventional pesticide formulations or compositions, e.g. conventional pesticide dispersible carrier vehicles, such as solutions, emulsions, suspensions, emulsifiable concentrate, spray powders, paste, soluble powders, dusting agents, granules, etc. These are prepared in known manner, for instance by extending the active compounds with conventional pesticide dispersible liquid diluent carriers and/or dispersible solid carriers optionally with the use of carrier vehicle assistants, e.g. conventional pesticide surface-active agents, including emulsifying agents and/or dispersing agents, whereby, for example, in the case where water is used as diluent, organic solvents may be added as auxiliary solvents. The following may be chiefly considered for use as conventional carrier vehicles for this purpose: inert dispersible liquid diluent carriers including inert organic solvents, such as aromatic hydrocarbons (e.g. benzene, toluene, xylene, etc.), halogenated, especially chlorinated, aromatic hydrocarbons (e.g. chloro-benzenes), paraffins (e.g. petroleum fractions), chlorinated aliphatic hydrocarbons (e.g. methylene chloride, etc.), alcohols (e.g. methanol, ethanol, propanol, butanol, etc.), ethers, ether-alcohols (e.g. glycol monomethyl ether, etc.), amines (e.g. ethanol-amine, etc.), amides (e.g. dimethyl formamide, etc.), sulfoxides (e.g. dimethyl sulfoxide, etc.), ketones (e.g. acetone, etc.), and/or water; as well as inert dispersible finely divided solid carriers, such as ground natural minerals (e.g. kaolins, alumina, silica, chalk, i.e. calcium carbonate, talc, kieselguhr, etc.), and ground synthetic minerals (e.g. highly dispersed silicic acid, silicates, e.g. alkali silicates, etc.); whereas the following may be chiefly considered for use as conventional carrier vehicle assistants, e.g. surface-active agents, for this purpose: emulsifying agents, such as non-ionic and/or anionic emulsifying agents (e.g. polyethylene oxide esters of fatty acids, polyethylene oxide ethers of fatty alcohols, alkyl sulfonates, aryl sulfonates, etc., and especially alkyl aryl-polyglycol ethers, magnesium stearate, sodium oleate, etc.); and/or dispersing agents, such as lignin, sulfite waste liquors, methyl cellulose, etc.

As will be appreciated by the artisan, the active compounds according to the instant invention may be employed alone or in the form of mixtures with one another and/or with such solid and/or liquid dispersible carrier vehicles and/or with other known compatible active agents, especially plant protection agents, such as other acaricides and insecticides, or herbicides, bactericides, etc., if desired, or in the form of particular dosage preparations for specific application made therefrom, such as solutions, emulsions, suspensions, powders, pastes, and granule which are thus ready for use.

As concerns commercially marketed preparations, these generally contemplate carrier composition mixtures in which the active compound is present in an amount substantially between about 0.1 and 95% by weight, and preferably 0.5 and 90% by weight, of the mixture, whereas carrier composition mixtures suitable for direct application or field application generally contemplate those in which the active compound is present in an amount substantially between about 0.005–20%, preferably 0.01–5%, by weight of the mixture. Thus, the present invention contemplates over-all compositions which comprise mixtures of a conventional dispersible carrier vehicle such as (1) a dispersible inert finely divided carrier solid, and/or (2) a dispersible carrier liquid such as an inert organic solvent and/or water preferably including a surface-active effective amount of a carrier vehicle assistant, e.g. a surface-active agent, such as an emulsifying agent and/or a dispersing agent, and an amount of the active compound which is effective for the purpose in question and which is generally between about 0.005–95%, and preferably 0.01–95%, by weight of the mixture.

The active compounds can also be used in accordance with the well-known ultra-low-volume process with good success, i.e., by applying such compound if normally a liquid, or by applying a liquid composition containing the same, via very effective atomizing equipment, in finely divided form, e.g. average particle diameter of from 50–100 microns, or even less, i.e. mist form, for example by airplane crop spraying techniques. Only up to at most about a few liters/hectare are needed, and often amounts only up to about 1 quart/acre, preferably 2–16 fluid ounces/acre, are sufficient. In this process it is possible to use highly concentrated liquid compositions with said liquid carrier vehicles containing from about 20 to about 95% by weight of the active compound or even the 100% active substance alone, e.g. about 20–100% by weight of the active compound.

Furthermore, the present invention contemplates methods of selectively killing, combatting or controlling pests, e.g. arthropods, i.e. insects and acaricids, and more particularly methods of combatting at least one of insects and acarids, and the like, which comprise applying to at least one of correspondingly (a) such insects, (b) such acarids, and (c) the corresponding habitat thereof, i.e. the locus to be protected, a correspondingly combattive or toxic amount, i.e. an arthropodicidally, especially insecticidally or acaricidally, effective amount, of the particular compound of the invention alone or together with a carrier vehicle as noted above. The instant formulations or compositions are applied in the usual manner, for example by spraying, atomizing, vaporizing, scattering, dusting, watering, sprinkling, squirting, and the like.

It will be realized, of course, that the concentration of the particular active compound utilized, alone or in admixture with the carrier vehicle, will depend upon the intended application, as the artisan will appreciate, and may be varied within a fairly wide range. Therefore, in special cases, it is possible to go above or below the aforementioned concentration ranges.

The following examples illustrate, without limitation, the arthropodicidal activity of the particular active compounds according to the present invention.

Example 1

Tetranychus test:
   Solvent: 3 parts by weight dimethyl formamide
   Emulsifier: 1 part by weight alkylaryl polyglycol ether To produce a suitable preparation of the particular active compound, 1 part by weight of such active compound is mixed with the stated amount of solvent containing the stated amount of emulsifier, and the resulting concentrate is diluted with water to the desired final concentration.

Bean plants (*Phaseolus vulgaris*), which have a height of approximately 10–30 cm., are sprayed with the preparation of the given active compound until dripping wet. These bean plants are heavily infested with spider mites (*Tetranychus urticae*) in all stages of development.

After the specified period of time, the effectiveness of the preparation of the given active compound is determined by counting the dead mites. The degree of destruction thus obtained is expressed as a percentage: 100% means that all the spider mites are killed, whereas 0% means that none of the spider mites are killed.

The particular active compounds tested, their concentrations, the evaluation time and the results obtained can be seen from the following Table 1.

TABLE 1.—PLANT-DAMAGING MITES
(*Tetranychus urticae*)

| Active compound | | Concentration of active compound in percent | Degree of destruction in percent after 48 hours |
|---|---|---|---|
| (A) | Pyrazole with CH$_3$, O–C(=O)–N(CH$_3$)$_2$, N–CH(CH$_3$)$_2$ substituents (known) | 0.2 | 0 |
| (B) | 3-phenyl-4-cyano-pyrazole, NH (known) | 0.2 | 0 |
| (1$_1$) | 3-(4-chlorophenyl)-4-cyano-1-methyl-pyrazole | 0.2<br>0.02 | 100<br>70 |
| (2$_1$) | 3-(2,4-dichlorophenyl)-4-cyano-1-methyl-pyrazole | 0.2<br>0.02 | 98<br>40 |
| (3$_1$) | 3-(4-methylphenyl)-4-cyano-1-methyl-pyrazole | 0.2 | 90 |
| (4$_1$) | 3-(4-chlorophenyl)-4-cyano-1-isopropyl-pyrazole | 0.2 | 80 |
| (5$_1$) | 3-(4-chlorophenyl)-4-cyano-1-(n-propyl)-pyrazole | 0.2<br>0.02 | 99<br>35 |
| (6$_1$) | 3-(4-chlorophenyl)-4-cyano-1-(C$_{12}$H$_{25}$-n)-pyrazole | 0.2 | 80 |

TABLE 1—Continued

| Active compound | | Concentration of active compound in percent | Degree of destruction in percent after 48 hours |
|---|---|---|---|
| (7₁) | [structure: 4-cyano-5-(4-fluorophenyl)-1-methylpyrazole] | 0.2<br>0.02 | 100<br>50 |

EXAMPLE 2

Phaedon test:
  Solvent: 3 parts by weight dimethyl formamide
  Emulsifier: 1 part by weight alkylaryl polyglycol ether To produce a suitable preparation of the particular active compound, 1 part by weight of such active compound is mixed with the stated amount of solvent containing the stated amount of emulsifier, and the resulting concentrate is diluted with water to the desired final concentration.

Horse-radish leaves (*Cochlearia armoratia*) are sprayed with the preparation of the given active compound until dripping wet and then infested with mustard beetle larvae (*Phaedon cochleariae*).

After the specified period of time, the degree of destruction is determined as a percentage: 100% means that all, and 0% means that none, of the beetle larvae are killed.

The particular active compounds tested, their concentrations, the evaluation time and the results obtained can be seen from the following Table 2.

TABLE 2.—PLANT-DAMAGING INSECTS
(*Phaedon larvae*)

| Active compound | | Concentration of active compound in percent | Degree of destruction in percent after 3 days |
|---|---|---|---|
| (A) | [structure: 1-isopropyl-3-methyl-pyrazol-5-yl N,N-dimethylcarbamate] (known) | 0.2<br>0.02 | 70<br>0 |
| (B) | [structure: 4-cyano-5-phenyl-1H-pyrazole] (known) | 0.2 | 0 |
| (4₂) | [structure: 4-cyano-5-(4-chlorophenyl)-1-isopropylpyrazole] | 0.2 | 100 |
| (5₂) | [structure: 4-cyano-5-(4-chlorophenyl)-1-propylpyrazole] | 0.2<br>0.02 | 100<br>25 |
| (8₁) | [structure: 4-cyano-5-(4-chlorophenyl)-1-(2-cyanoethyl)pyrazole] | 0.2 | 100 |

TABLE 2—Continued

| Active compound | | Concentration of active compound in percent | Degree of destruction in percent after 3 days |
|---|---|---|---|
| (9₁) | 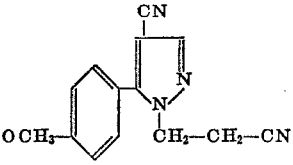 | 0.2 | 100 |

The following further examples illustrate, without limitation, the manner of producing the active compounds usable according to the present invention.

EXAMPLE 3

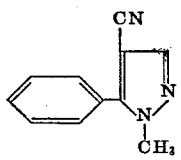 (10₁)

5 g. (0.11 mol) methylhydrazine are added dropwise at 15 to 20° C., with stirring, to a mixture of 20.1 g. (0.10 mol) α-ethoxymethylene-α-benzoyl-acetonitrile and 175 ml. glacial acetic acid as solvent. Heating is then slowly effected to 80° C., and stirring is continued at this temperature for about 2 hours. After evaporation of the solvent and formed ethanol and water under reduced pressure, the oily residue is subjected to high-vacuum distillation. The main fraction comes over as a viscous, colorless oil, which immediately solidifies in the receiver. By recrystallization in a little alcohol, 17 g. 1-methyl-4-cyano-5-phenyl-pyrazole are obtained in the form of colorless crystals of M.P. 59 to 61° C.

(b) The same product is obtained under otherwise the same conditions when the acetic acid is replaced by propionic acid, butyric acid or valeric acid.

In order to prove the constitution of the reaction product, it is hydrolyzed by heating for several hours with excess alcoholic solution of potassium hydroxide (5%) at 160° C. in an autoclave to form carboxylic acid, and this is decarboxylated thermally in the presence of copper powder. A gas chromatigraphically homogeneous liquid of B.P. 126 to 127° C. with an odor similar to pyridine is formed which is identical to the 1-methyl-5-pyrazole prepared according to another set of instructions (K. v. Auwerts and W. Schmidt, Ber. 58,528 to 543 (1925)).

(d) The α-ethoxymethylene-α-benzoyl-acetonitrile used as starting material can be prepared as follows:

A mixture of 100 g. benzoyl-acetonitrile, 125 g. o-formic acid ethyl ester, 175 g. acetic anhydride and 1 to 3 g. $ZnCl_2$ is heated to 110 to 120° C. by means of an oil-bath, an all volatile matter is distilled off in this temperature range at normal pressure. When no more distillate comes over, cooling to 70° to 80° C. is effected, and residues of formic acid ester and acetic anhydride are driven over as completely as possible in a water-jet vacuum. The oily, brown residue is triturated with ether, with ice cooling, until the whole mass is crystallized through. The slurry of crystals is filtered off with suction, washed with cold (−10° C.) alcohol, and recrystallized from a little alcohol.

There are thus obtained about 70 g. of yellowish-colored α-ethoxymethylene-α-benzoyl-acetonitrile which is pure enough for further reaction. A preparation purified by high-vacuum distillation and subsequent recrystallization from alcohol is completely colorless and melts at 70 to 72° C.

EXAMPLE 4

Compounds of the general formula:

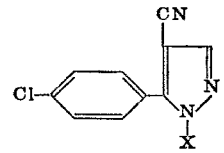

are obtained when a mixture of 23.6 g. (0.10 mol) α-ethoxymethylene-β-(p-chloro - benzoyl)-acetonitrile of M.P. 102–105° C. and 150–200 ml. glacial acetic acid is reacted as described under Example 3(a) with at least 0.11 mol of any desired monosubstituted hydrazine (i.e. corresponding to substituent X). After evaporation of the solvent and formed ethanol and water in a vacuum, the reaction product solidifies in most cases into a slurry of crystals, which is filtered off cold with suction and, if desired, recrystallized from a suitable solvent.

If the crude product lacks the tendency to crystallize, purification may be effected by distillation in a high vacuum. In the following table, there are listed a number of typical representatives of the 4-cyano-pyrazoles of Formula I above so obtained:

| X (when Y=4-Cl-phenyl) | M.P., °C. | B.P., °C. | Solvent for recrystallization |
|---|---|---|---|
| (1₂) —CH₃ | 112–114 | | Alcohol. |
| (11₁) —C₂H₅ | 114–117 | | Do. |
| (5₃) n-C₃H₇ | 61–62 | | Benzene/petroleum ether. |
| (4₃) i-C₃H₇ | 104–105 | | Alcohol. |
| (12₁) n-C₄H₉ | 76–78 | | Benzene/petroleum ether. |
| (6₂) n-C₁₂H₂₅ | Oil | [1] 185–190 | |
| (8₂) —CH₂CH₂CN | 114 | | Alcohol. |

[1] 0.001 mm. Hg.

In analogous manner, the following compounds of Formula I above are also obtained:

| X | Y | M.P., °C. | B.P., °C. | Solvent for recrystallization. |
|---|---|---|---|---|
| (13₁) CH₃ | 2,3,4,5-tetrachlorophenyl | 203-204 | | Alcohol. |
| (3₂) CH₃ | 4-methylphenyl | 61-62 | | Benzene/petroleum ether. |
| (14₁) CH₃ | 4-trifluoromethylphenyl | 71-73 | | Alcohol. |
| (2₂) CH₃ | 2,4-dichlorophenyl | 100-102 | | Do. |
| (15₁) CH₃ | 4-cyanophenyl | 171-173 | | Do. |
| (7₂) CH₃ | 4-fluorophenyl | 125-127 | | Do. |
| (9₂) CH₂—CH₂—CN | 4-methoxyphenyl | 90-91 | | Do. |
| (16₁) CH₂—CH₂—OH | phenyl | 102-104 | | Do. |

The foregoing typical compounds usable according to the present invention may be designated:

(1) 1-methyl-4-cyano-5-(4'-chloro-phenyl)-pyrazole
(2) 1-methyl-4-cyano-5-(2',4'-dichloro-phenyl)-pyrazole
(3) 1-methyl-4-cyano-5-(4'-methyl-phenyl)-pyrazole
(4) 1-isopropyl-4-cyano-5-(4'-chloro-phenyl)-pyrazole
(5) 1-n-propyl-4-cyano-5-(4'-chloro-phenyl)-pyrazole
(6) 1-n-dodecyl-4-cyano-5-(4'-chloro-phenyl)-pyrazole
(7) 1-methyl-4-cyano-5-(4'-fluoro-phenyl)-pyrazole
(8) 1-(2'-cyano-ethyl)-4-cyano-5-(4''-chloro-phenyl)-pyrazole
(9) 1-(2'-cyano-ethyl)-4-cyano-5-(4''-methoxy-phenyl)-pyrazole
(10) 1-methyl-4-cyano-5-phenyl-pyrazole
(11) 1-ethyl-4-cyano-5-(4'-chloro-phenyl)-pyrazole
(12) 1-n-butyl-4-cyano-5-(4'-chloro-phenyl)-pyrazole
(13) 1-methyl-4-cyano-5-(2',3',4',5'-tetra-chloro-phenyl)-pyrazole
(14) 1-methyl-4-cyano-5-(4'-trifluoromethyl-phenyl)-pyrazole
(15) 1-methyl-4-cyano-5-(4'-cyano-phenyl)-pyrazole.

It will be realized that all of the foregoing compounds contemplated by the present invention possess the desired selective pesticidal, especially arthropodicidal, i.e. insecticidal or acaricidal, properties for combating insects and acarids, and that such compounds have not only a very slight toxicity toward warm-blooded creatures, but also a concomitantly low phytotoxicity.

As may be used herein, the terms "arthropod," "arthropodicidal" and "arthropodicide" contemplate specifically both insects and acarids. Thus, the insects and acarids may be considered herein collectively as arthropods to be combated in accordance with the invention, and accordingly the insecticidal and/or acaricidal activity may be termed arthropodicidal activity, and the concomitant combative or effective amount used will be an arthropodicidally effective amount which in effect means an insecticidally or acaricidally effective amount of the active compound for the desired purposes.

It will be appreciated that the instant specification and examples are set forth by way of illustration and not limitation, and that various modifications and changes may be made without departing from the spirit and scope of the present invention.

What is claimed is:
1. 1,5-disubstituted-4-cyano-pyrazole of the formula

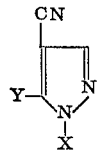

in which X is selected from the group consisting of alkyl of 1–12 carbon atoms, hydroxyalkyl of 2–4 carbon atoms and cyanoalkyl of 1–4 carbon atoms, and Y is selected from the group consisting of mono to tetra chloro-substituted phenyl, fluorophenyl, alkylphenyl having 1–4 carbon atoms in the alkyl moiety, alkoxyphenyl having 1–4 carbon atoms in the alkoxy moiety, trifluoromethyl-phenyl and cyanophenyl.

2. Compound according to claim 1 wherein X is selected from the group consisting of alkyl of 1–12 carbon atoms, hydroxyalkyl of 2–3 carbon atoms and cyanoalkyl of 1–4 carbon atoms, and Y is selected from the group consisting of mono to tetra chloro-phenyl, 4-fluorophenyl, 4-alkyl-phenyl wherein the alkyl group has 1–4 carbon atoms, 4-alkoxy-phenyl wherein the alkoxy group has 1–4 carbon atoms, 4 - trifluoromethyl-phenyl and 4-cyano-phenyl.

3. Compound according to claim 1 wherein X is selected from the group consisting alkyl of 1–12 carbon atoms, hydroxyalkyl of 2–3 carbon atoms and cyano-alkyl of 1–4 carbon atoms, and Y is selected from the group consisting of 4 - chloro-phenyl, 2,4-dichloro-phenyl, 2,3,4,5-tetra-chloro-phenyl, 4-fluoro-phenyl, 4-methyl-phenyl, 4-methoxy-phenyl, 4 - trifluoromethyl-phenyl and 4-cyano-phenyl.

4. Compound according to claim 1 wherein such compound is 1-methyl-4-cyano-5-(4'-chloro-phenyl)-pyrazole of the formula

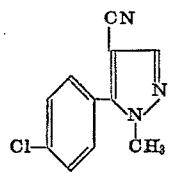

5. Compound according to claim 1 wherein such compound is 1-methyl-4-cyano-5-(4'-methyl-phenyl)-pyrazole of the formula

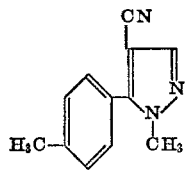

6. Compound according to claim 1 wherein such compound is 1-n-dodecyl-4-cyano-5-(4'-chloro-phenyl)-pyrazole of the formula

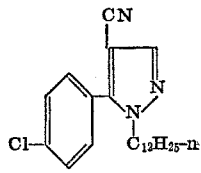

7. Compound according to claim 1 wherein such compound is 1-methyl-4-cyano-5-(4'-fluoro-phenyl)-pyrazole of the formula

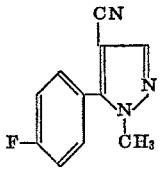

8. Compound according to claim 1 wherein such compound is 1-(2'-cyano-ethyl)-4-cyano-5-(4'''-methoxy-phenyl)-pyrazole of the formula

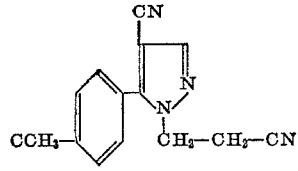

9. Compound according to claim 1 wherein such compound is 1-methyl-4-cyano-5-(2',4'-dichloro-phenyl)-pyrazole of the formula

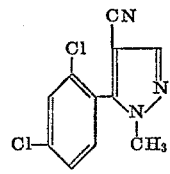

10. Compound according to claim 1 wherein such compound is 1-isopropyl-4-cyano-5-(4'-chloro-phenyl)-pyrazole of the formula

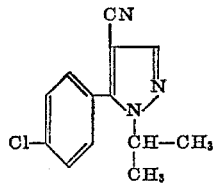

11. Compound according to claim 1 wherein such compound is 1-n-propyl-4-cyano-5-(4'-chloro-phenyl)-pyrazole of the formula

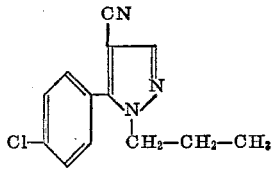

12. Compound according to claim 1 wherein such compound is 1-(2'-cyano-ethyl)-4-cyano-5-(4''-chloro-phenyl)-pyrazole of the formula

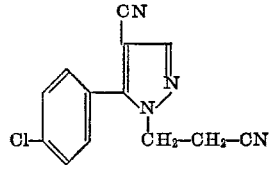

References Cited

Grandberg et al., Chemisches Zentralblatt vol. 137, No. 50, Abstract No. 1035 (1966).

Bastide et al., Comptes Rendus (Acad. des Sciences, Paris) vol. 268, Ser. C, pp. 532–5 (Feb. 10, 1969).

NATALIE TROUSOF, Primary Examiner

U.S. Cl. X.R.

260—465 E, 465 F; 424—273

UNITED STATES PATENT OFFICE
CERTIFICATE OF CORRECTION

Patent No. 3,658,839      Dated April 25, 1972

Inventor(s) Hartmut Kiehne, et al

It is certified that error appears in the above-identified patent and that said Letters Patent are hereby corrected as shown below:

Col. 11, line 54

Insert "(c)" before "In order to prove"

Col. 11, line 63

"5-pyrazole" should be "5-phenyl-pyrazole"

Col. 12, line 58

"puriflcation" should be "purification"

Col. 15, line 54

"$CCH_3$" should be "$CH_3O$"

Signed and sealed this 28th day of November 1972.

(SEAL)
Attest:

EDWARD M. FLETCHER, JR.
Attesting Officer

ROBERT GOTTSCHALK
Commissioner of Patents